US012640444B2

(12) United States Patent (10) Patent No.: US 12,640,444 B2
Park et al. (45) Date of Patent: May 26, 2026

(54) BATTERY MODULE, BATTERY PACK INCLUDING THE SAME AND METHOD OF MANUFACTURING BATTERY MODULE

(71) Applicant: LG ENERGY SOLUTION, LTD., Seoul (KR)

(72) Inventors: Won Kyoung Park, Daejeon (KR); Junyeob Seong, Daejeon (KR); Subin Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1086 days.

(21) Appl. No.: 17/766,858

(22) PCT Filed: Jul. 12, 2021

(86) PCT No.: PCT/KR2021/008914
§ 371 (c)(1),
(2) Date: Apr. 6, 2022

(87) PCT Pub. No.: WO2022/030785
PCT Pub. Date: Feb. 10, 2022

(65) Prior Publication Data
US 2024/0072389 A1 Feb. 29, 2024

(30) Foreign Application Priority Data
Aug. 5, 2020 (KR) ........................ 10-2020-0097868

(51) Int. Cl.
H01M 50/536 (2021.01)
H01M 10/04 (2006.01)
(Continued)

(52) U.S. Cl.
CPC ..... H01M 50/536 (2021.01); H01M 10/0468 (2013.01); H01M 10/653 (2015.04);
(Continued)

(58) Field of Classification Search
CPC .. B23K 2101/38; B23K 26/22; B23K 26/244; B23K 26/32; B23K 37/0443;
(Continued)

(56) References Cited

U.S. PATENT DOCUMENTS

2010/0174292 A1 7/2010 Labadie et al.
2010/0247996 A1 9/2010 Ijaz et al.
(Continued)

FOREIGN PATENT DOCUMENTS

CN 101952994 A 1/2011
CN 107710450 A 2/2018
(Continued)

OTHER PUBLICATIONS

International Search ReporT (PCT/ISA/210) issued in PCT/KR2021/008914, dated Nov. 2, 2021.

*Primary Examiner* — Lingwen R Zeng
(74) *Attorney, Agent, or Firm* — Birch, Stewart, Kolasch & Birch, LLP

(57) ABSTRACT

A battery module includes a battery cell stack that is formed by stacking a plurality of battery cells along a first direction, an insulating cover that covers both end parts of the battery cell stack, a holding member that wraps both end parts of the battery cell stack adjacent to the insulating cover, and a first electrode lead and a second electrode lead that protrude from each of a first battery cell and a second battery cell adjacent to each other included in the battery cell stack, the first electrode lead and the second electrode lead are bent in different directions from each other, and the first electrode lead and the second electrode lead overlap with each other to form a welding part and an extra space between the welding part and the battery cell stack.

7 Claims, 11 Drawing Sheets

(51) Int. Cl.

| | |
|---|---|
| *H01M 10/653* | (2014.01) |
| *H01M 50/148* | (2021.01) |
| *H01M 50/209* | (2021.01) |
| *H01M 50/242* | (2021.01) |
| *H01M 50/533* | (2021.01) |
| *B23K 26/22* | (2006.01) |
| *B23K 26/244* | (2014.01) |
| *B23K 26/32* | (2014.01) |
| *B23K 37/04* | (2006.01) |
| *B23K 101/38* | (2006.01) |
| *H01M 50/178* | (2021.01) |
| *H01M 50/24* | (2021.01) |
| *H01M 50/474* | (2021.01) |
| *H01M 50/489* | (2021.01) |
| *H01M 50/502* | (2021.01) |
| *H01M 50/516* | (2021.01) |

(52) U.S. Cl.
CPC ....... *H01M 50/148* (2021.01); *H01M 50/209* (2021.01); *H01M 50/242* (2021.01); *H01M 50/533* (2021.01); *B23K 26/22* (2013.01); *B23K 26/244* (2015.10); *B23K 26/32* (2013.01); *B23K 37/0443* (2013.01); *B23K 2101/38* (2018.08); *H01M 50/178* (2021.01); *H01M 50/24* (2021.01); *H01M 50/474* (2021.01); *H01M 50/489* (2021.01); *H01M 50/502* (2021.01); *H01M 50/516* (2021.01); *H01M 2220/20* (2013.01); *Y02E 60/10* (2013.01)

(58) Field of Classification Search
CPC ........... H01M 10/0468; H01M 10/653; H01M 2220/20; H01M 50/148; H01M 50/178; H01M 50/209; H01M 50/24; H01M 50/242; H01M 50/474; H01M 50/489; H01M 50/502; H01M 50/516; H01M 50/533; H01M 50/536; Y02E 60/10
See application file for complete search history.

(56) References Cited

U.S. PATENT DOCUMENTS

| | | | |
|---|---|---|---|
| 2010/0247997 A1 | 9/2010 | Hostler et al. | |
| 2010/0247998 A1 | 9/2010 | Hostler et al. | |
| 2010/0247999 A1 | 9/2010 | Ijaz et al. | |
| 2010/0248010 A1 | 9/2010 | Butt et al. | |
| 2010/0248029 A1 | 9/2010 | Butt et al. | |
| 2010/0255351 A1 | 10/2010 | Ijaz et al. | |
| 2012/0196170 A1 | 8/2012 | Ijaz et al. | |
| 2014/0127550 A1 | 5/2014 | Roh et al. | |
| 2015/0072205 A1 | 3/2015 | Jung et al. | |
| 2015/0380697 A1* | 12/2015 | Osborne ............ | H01M 50/502 |
| | | | 429/153 |
| 2016/0226043 A1 | 8/2016 | Lee et al. | |
| 2018/0033831 A1 | 2/2018 | An et al. | |
| 2018/0159096 A1 | 6/2018 | Kim et al. | |
| 2020/0152931 A1 | 5/2020 | Kim et al. | |
| 2020/0357859 A1 | 11/2020 | An et al. | |
| 2021/0159535 A1 | 5/2021 | Choi et al. | |

FOREIGN PATENT DOCUMENTS

| | | | |
|---|---|---|---|
| CN | 107732279 | A | 2/2018 |
| CN | 209087946 | U | 7/2019 |
| JP | 2012-515418 | A | 7/2012 |
| JP | 5558878 | B2 | 7/2014 |
| JP | 2014-523623 | A | 9/2014 |
| JP | 2018-152223 | A | 9/2018 |
| KR | 10-2011-0114649 | A | 10/2011 |
| KR | 10-1509474 | B1 | 4/2015 |
| KR | 10-1541385 | A1 | 8/2015 |
| KR | 10-1675617 | B1 | 11/2016 |
| KR | 10-2017-0019041 | A | 2/2017 |
| KR | 10-2017-0043313 | A | 4/2017 |
| KR | 10-2018-0017696 | A | 2/2018 |
| KR | 10-2020-0068215 | A | 5/2020 |
| KR | 10-2020-0086933 | A | 7/2020 |
| WO | WO 2014/128841 | A1 | 8/2014 |
| WO | WO 2015/046898 | A1 | 4/2015 |
| WO | WO 2016/004079 | A1 | 1/2016 |

* cited by examiner

【FIG. 1】
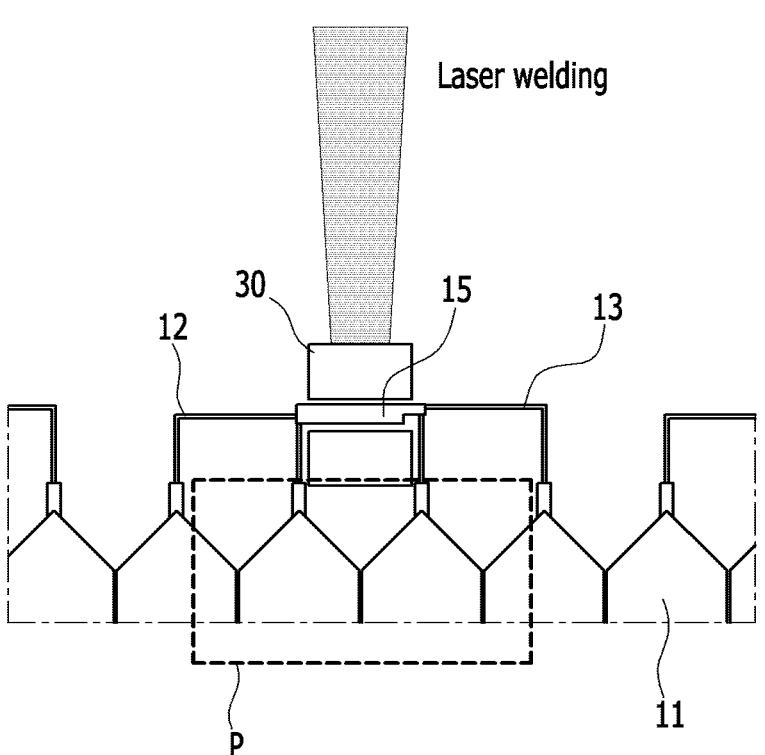
Conventional Art

【FIG. 2】
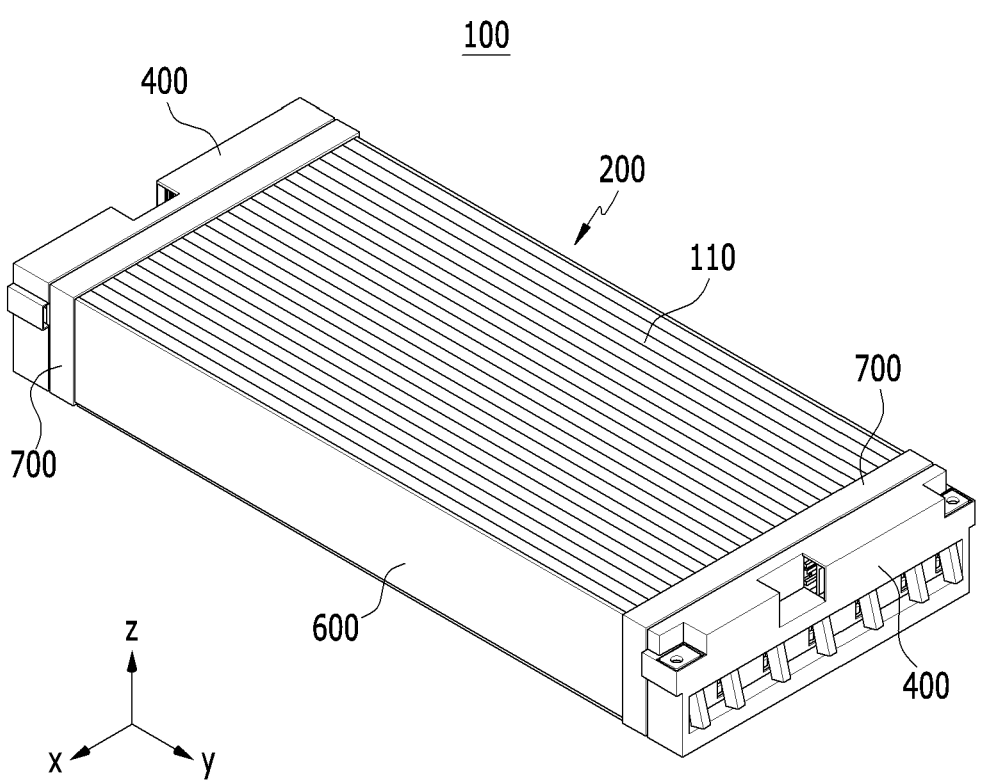

[FIG. 3]
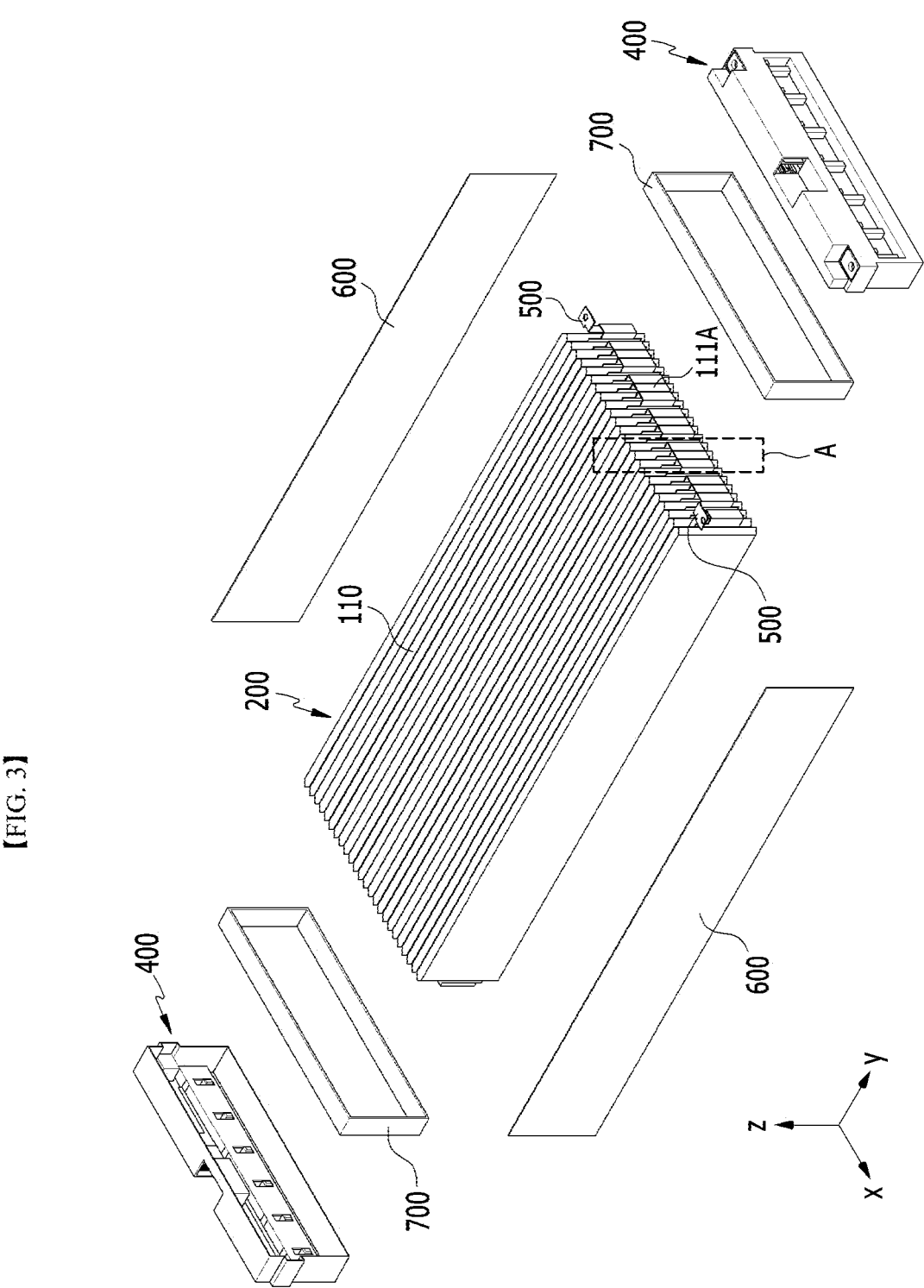

【FIG. 4】
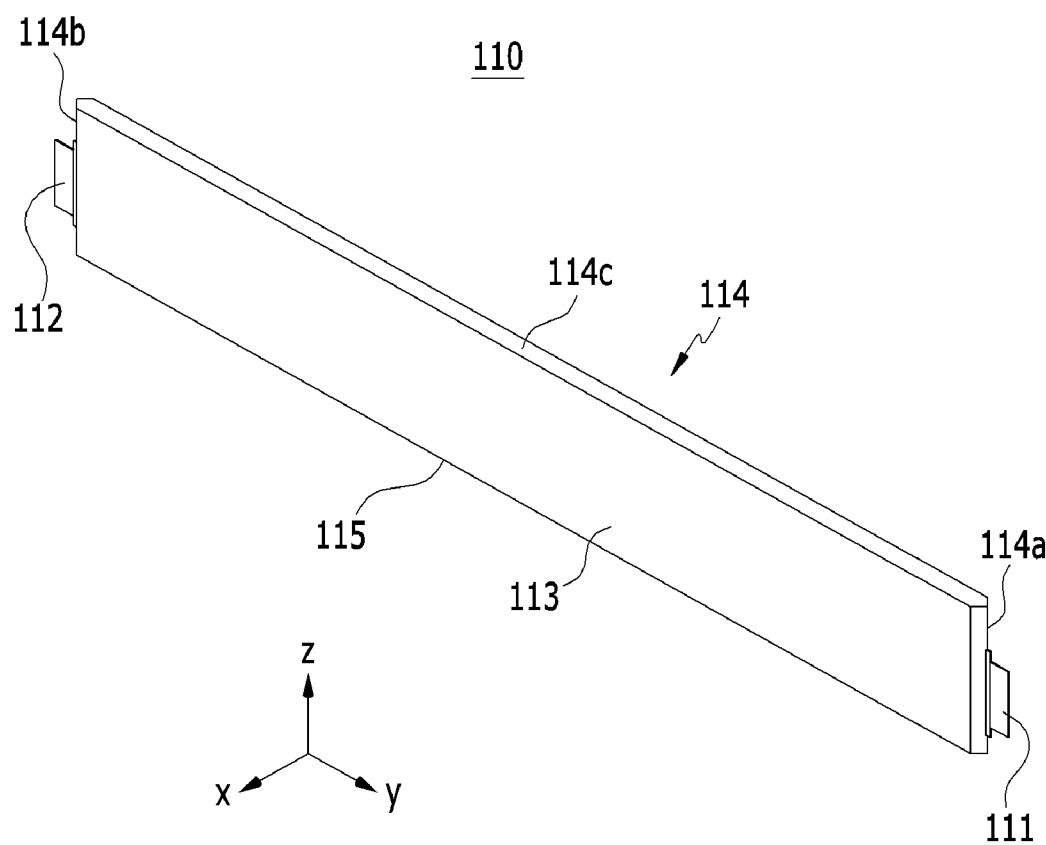

【FIG. 5】
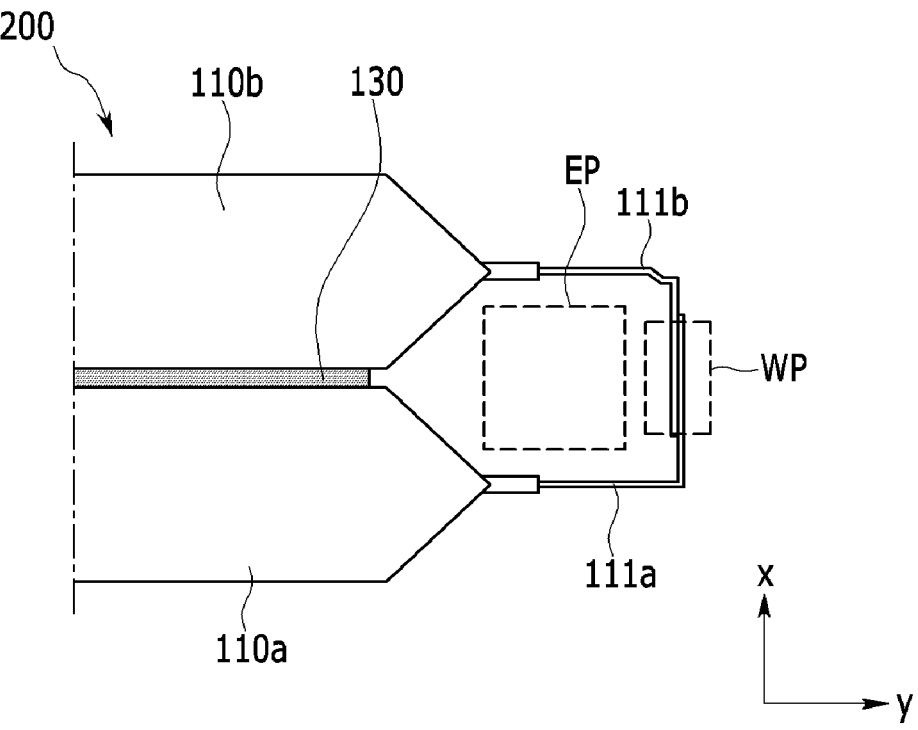
【FIG. 6】
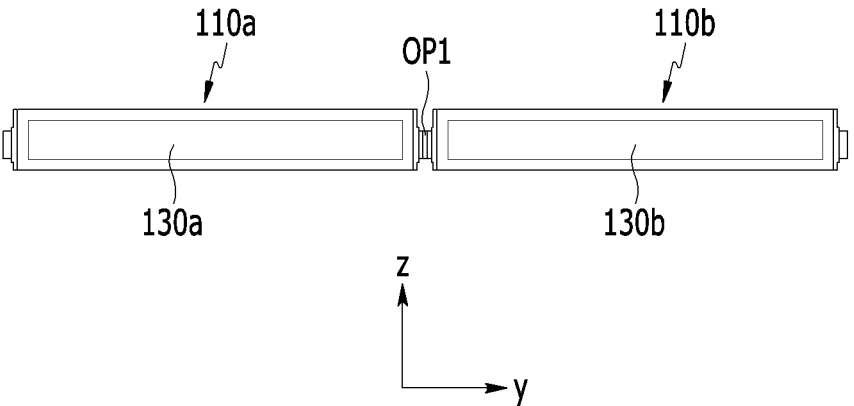

【FIG. 7】
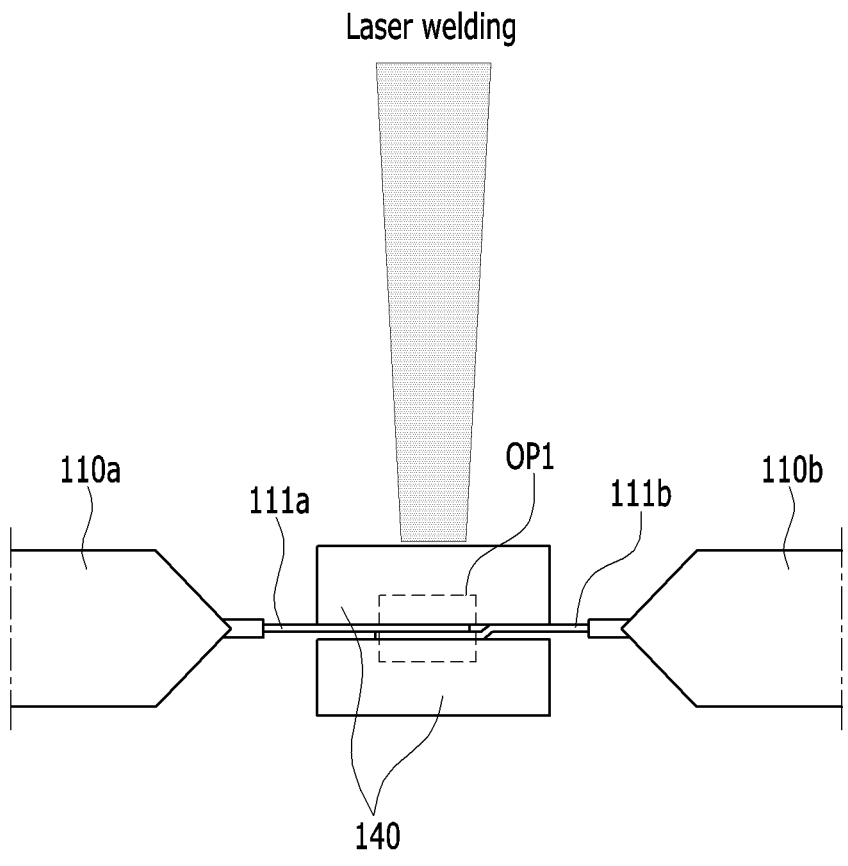

【FIG. 8】
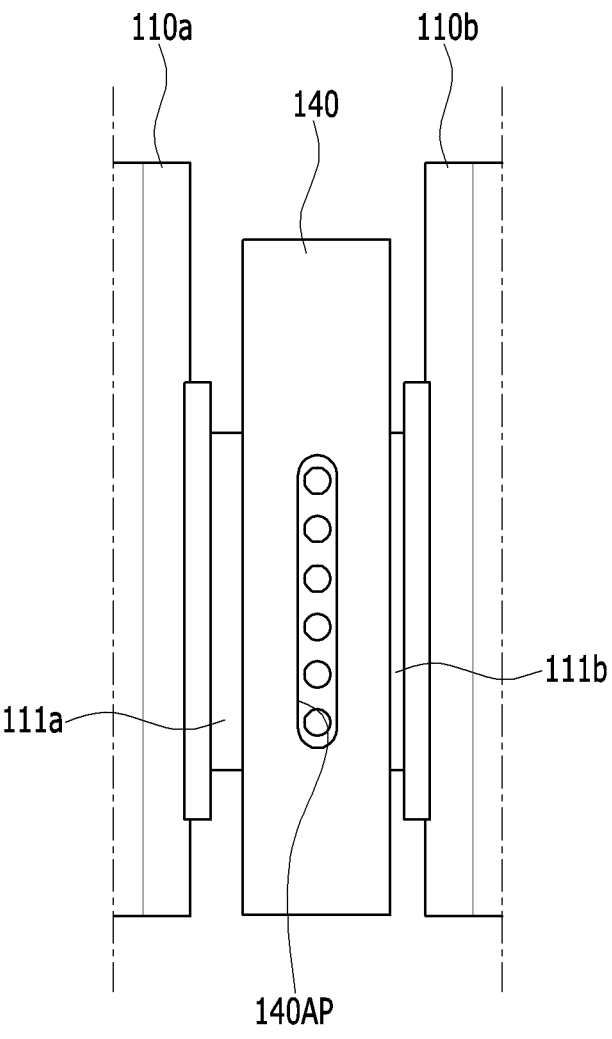

【FIG. 9】
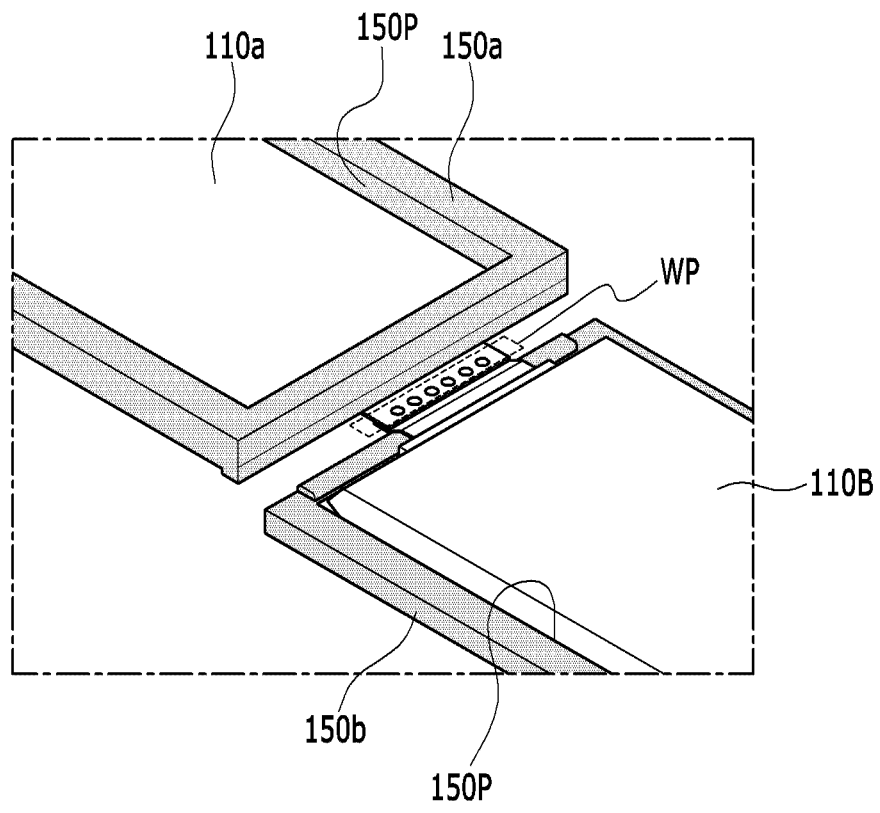
【FIG. 10】
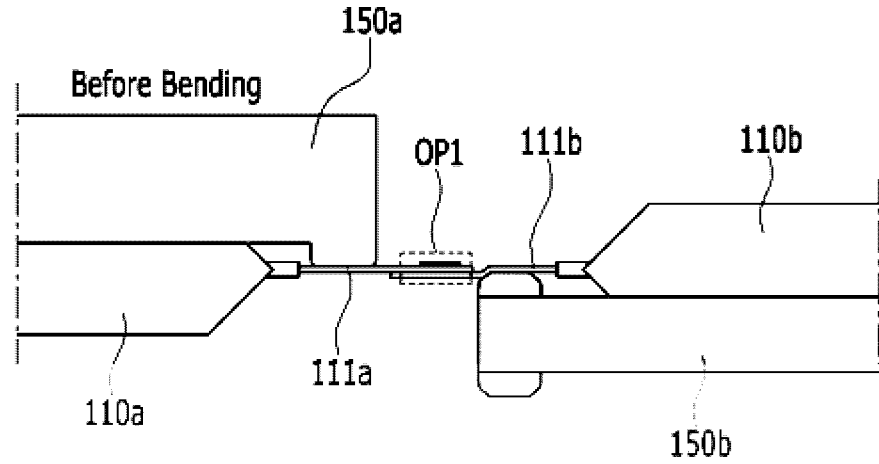

【FIG. 11】
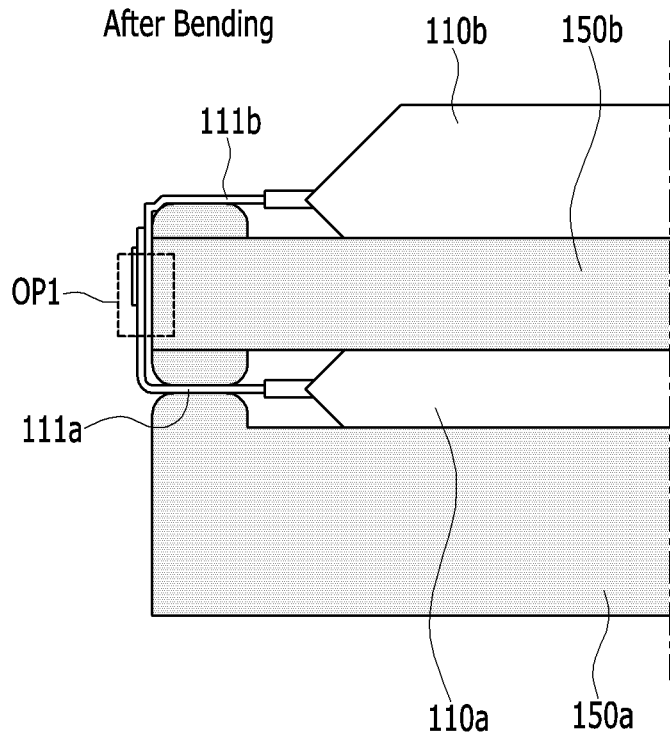
【FIG. 12】
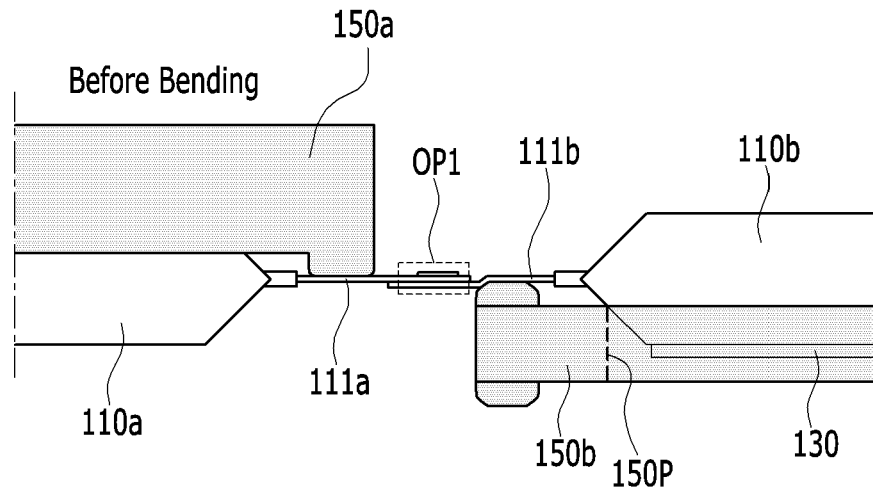

【FIG. 13】
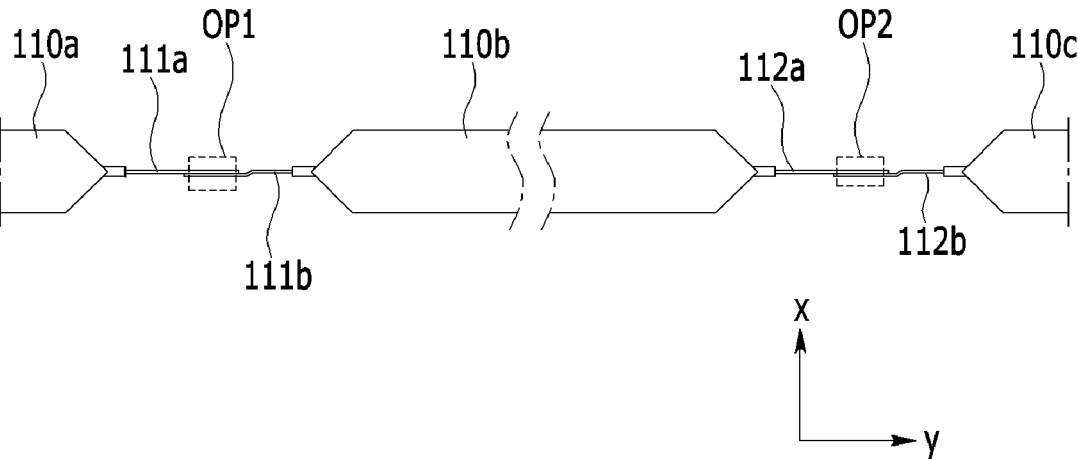
【FIG. 14】
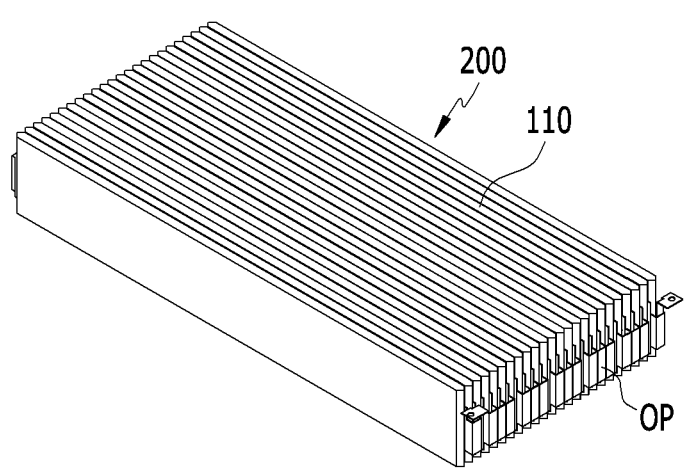

【FIG. 15】
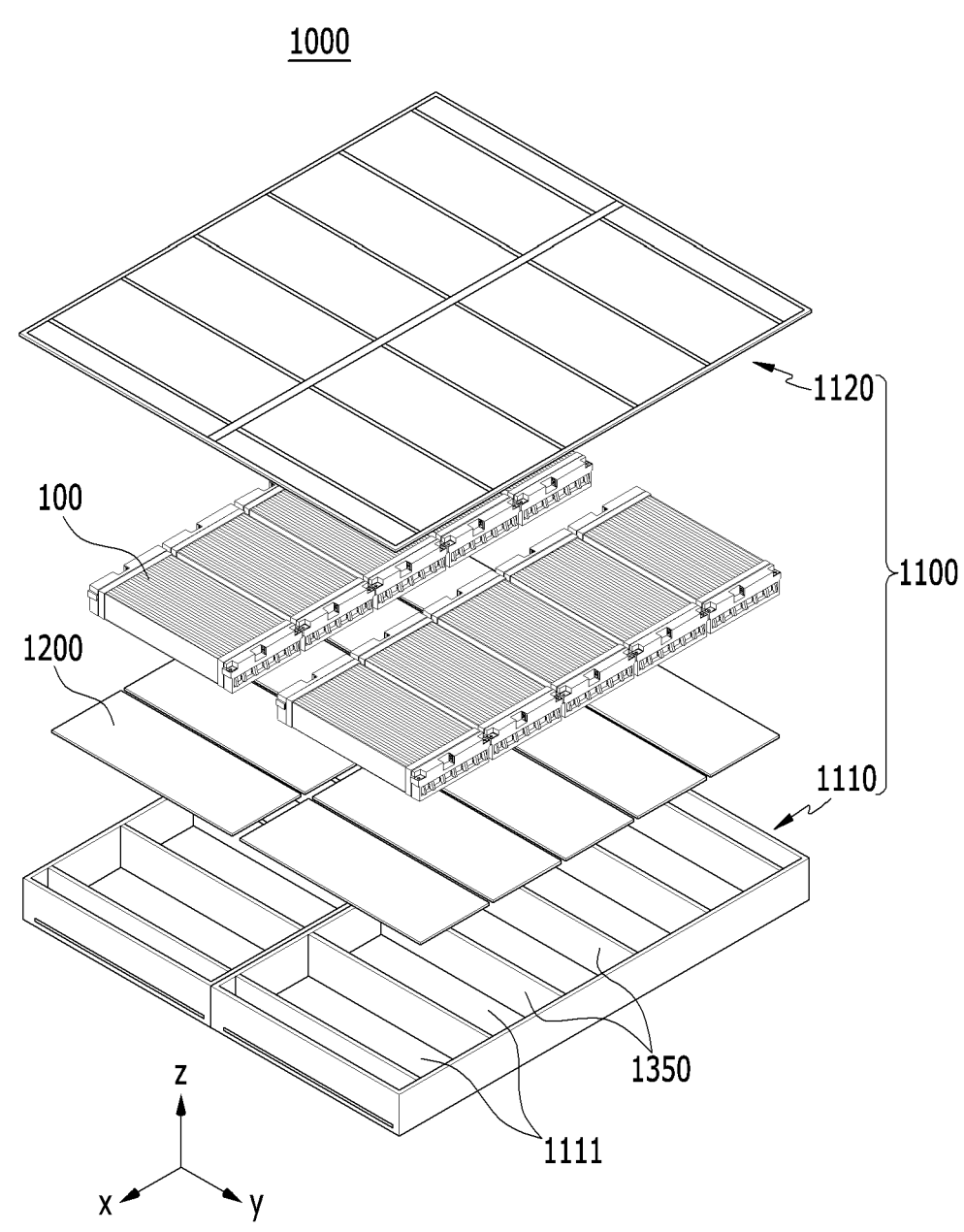

BATTERY MODULE, BATTERY PACK INCLUDING THE SAME AND METHOD OF MANUFACTURING BATTERY MODULE

TECHNICAL FIELD

Cross Citation with Related Application(s)

This application claims the benefit of Korean Patent Application No. 10-2020-0097868 filed on Aug. 5, 2020 with the Korean Intellectual Property Office, the disclosure of which is incorporated herein by reference in its entirety.

The present disclosure relates to a battery module, a battery pack including the same and a method of manufacturing the battery module, and more particularly, to a battery module manufactured by a novel process, a battery pack including the same and a method of manufacturing the battery module.

BACKGROUND

With the increase of the technological development and demand for a mobile device, demand for a secondary battery as an energy source is rapidly increasing, and accordingly, many researches of the battery capable of meeting a variety of needs are emerging.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Small-sized mobile devices use one or several battery cells for each device, whereas middle or large-sized devices such as vehicles require high power and large capacity. Therefore, a middle or large-sized battery module having a plurality of battery cells electrically connected to one another is used.

Preferably, the middle or large-sized battery module is manufactured so as to have as small a size and weight as possible. Consequently, a prismatic battery, a pouch-shaped battery or the like, which can be stacked with high integration and has a small weight relative to capacity, is mainly used as a battery cell of the middle- or large-sized battery module. Meanwhile, in order to protect the battery cell stack from external impact, heat or vibration, the battery module may include a module frame in which a front surface and back surface are opened to house the battery cell stack in an internal space.

In order for the middle or large-sized battery pack to provide output and capacity required by a specific apparatus or device, a plurality of battery cells should be electrically connected in series to each other.

FIG. 1 is a view for explaining the method of welding an electrode lead in the battery cell stack included in a conventional battery module.

Referring to FIG. 1, one or more electrode leads 12 and 13 bent onto a bus bar 15 can be welded using a jig 30. At this time, the material of the bus bar 15 is required, and in some cases, plating is required and thus, material costs may increase. Further, since the space of the P region of FIG. 1 corresponding to the rear face space of the electrode leads 12 and 13 is insufficient, it is difficult to confirm whether the welding surface contact is performed, which makes it difficult to guarantee the welding quality.

In this case, since the electrode leads 12 and 13 are bent after stacking the battery cells 11 to proceed with welding, the quality of the bending process can affect the welding quality. Because welding proceeds after stacking the battery cells 11, there is a problem that it is difficult to reuse the battery cell 11 if a defect occurs during welding.

DETAILED DESCRIPTION OF THE INVENTION

Technical Problem

It is an object of the present disclosure to provide a battery module manufactured by a new process that solves the problems of the existing welding process, a battery pack including the same and a method of manufacturing the battery module.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack that is formed by stacking a plurality of battery cells along a first direction, the battery cell stack including a first end part and a second end part; an insulating cover that covers the first end part and the second end part of the battery cell stack; a holding member that wraps the first end part and the second end part of the battery cell stack adjacent to the insulating cover; and a first electrode lead protruding from a first battery cell included in the battery cell stack and a second electrode lead protruding from a second battery cell adjacent to the first battery cell and included in the battery cell stack; wherein the first electrode lead and the second electrode lead are bent in different directions from each other, bent in different directions from each other, and the first electrode lead and the second electrode lead overlap with each other, thereby forming a welding part, and wherein an extra space is formed between the welding part and the battery cell stack.

One of the first electrode lead and the second electrode lead may be a positive electrode lead, and an other of the first electrode lead and the second electrode lead may be a negative electrode lead.

On overlapping part of the first electrode lead and the second electrode lead on which the welding part is formed may be directly opposite to the battery cell stack.

According to another embodiment of the present disclosure, there is provided a battery pack comprising: the above-mentioned battery module, a pack frame that houses the battery module, and a heat conductive resin layer that is disposed between the battery module and the bottom part of the pack frame.

According to yet another embodiment of the present disclosure, there is provided a method of manufacturing a battery module, the method comprising the steps of: arranging a first battery cell and a second battery cell in a horizontal direction, and overlapping a first electrode lead protruding from the first battery cell and a second electrode lead protruding from the second battery cell, welding a first overlapping part of the first electrode lead and the second electrode lead, vertically arranging the first battery cell and the second battery cell by bending the first electrode lead and the second electrode lead based on the first overlapping part, and coupling the first battery cell and the second battery cell to each other by a first adhesive member.

The step of bending the first electrode lead and the second electrode lead based on the first overlapping part may be performed using a first jig and a second jig respectively disposed on one surface of the first battery cell and one surface of the second battery cell, and the first jig and the second jig may be disposed on mutually different sides based on the first overlapping part.

The first jig presses the first electrode lead, the second jig presses the second electrode lead, and the first jig rotates together with the first battery cell so that the first battery cell and the second battery cell can be vertically arranged.

The method of manufacturing a battery module may further include disassembling the first jig and the second jig, after the step of vertically arranging the first battery cell and the second battery cell, wherein the first jig and the second jig are disassembled into two equal parts, respectively.

The method of manufacturing a battery module further includes arranging the second battery cell and the third battery cell in a horizontal direction, and overlapping a third electrode lead protruding from the second battery cell and a fourth electrode lead protruding from the third battery cell, welding a second overlapping part of the third electrode lead and the fourth electrode lead, vertically arranging the second battery cell and the third battery cell by bending the third electrode lead and the fourth electrode lead based on the second overlapping part, and coupling the second battery cell and the third battery cell to each other by a second adhesive member, wherein a direction in which the first electrode lead and the second electrode lead are bent and a direction in which the third electrode lead and the fourth electrode lead are bent based on the second overlapping part may form a zigzag structure with each other.

The second electrode lead and the third electrode lead have different polarities from each other, and the second electrode lead and the third electrode lead may be located at mutually different end parts based on the longitudinal direction of the second battery cell.

The step of welding the overlapping part may further include pressing both surfaces of the first overlapping part by welding jigs disposed on both surfaces of the first overlapping part.

Advantageous Effects

According to embodiments of the present disclosure, it is possible to improve the welding quality by welding electrode leads before bending.

In addition, after welding, the electrode leads are bent using jigs disposed on mutually different sides based on the overlapping part of the electrode leads, thereby increasing the alignment accuracy of the battery cell stack and increasing the space utilization rate.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a view for explaining the method of welding an electrode lead in the battery cell stack included in a conventional battery module;

FIG. 2 is a perspective view illustrating a battery module according to one embodiment of the present disclosure;

FIG. 3 is an exploded perspective view of the battery module of FIG. 2;

FIG. 4 is a perspective view of a battery cell included in the battery module of FIG. 2;

FIG. 5 is a partial cross-sectional view of the region A of FIG. 3 as viewed on the xy plane;

FIGS. 6 to 14 are views illustrating a method of manufacturing a battery module according to another embodiment of the present disclosure; and FIG. 15 is an exploded perspective view illustrating a battery pack according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 2 is a perspective view illustrating a battery module according to one embodiment of the present disclosure. FIG. 3 is an exploded perspective view of the battery module of FIG. 2. FIG. 4 is a perspective view of a battery cell included in the battery module of FIG. 2.

Referring to FIGS. 2 to 4, a battery module 100 according to one embodiment of the present disclosure includes a battery cell stack 200 in which a plurality of battery cells 110 are stacked.

First, the battery cell 110 is preferably a pouch-type battery cell, and may be formed into a rectangular sheet-like structure. For example, the battery cell 110 according to the present embodiment has a structure in which two electrode leads 111 and 112 protrude from one end part 114a and the other end part 114b which are disposed on the opposite sides to each other in reference to the cell body 113, respectively.

More specifically, the electrode leads 111 and 112 are connected to an electrode assembly and protrude from the electrode assembly to the outside of the battery cell 110. One of the two electrode leads 111 and 112 may be a positive electrode lead 111 and the other may be a negative electrode lead 112. That is, the positive electrode lead 111 and the negative electrode lead 112 can be protruded in opposite directions to each other in reference to one battery cell 110.

Meanwhile, the battery cell 110 can be produced by joining both end parts 114a and 114b of a cell case 114 and one side part 114c connecting them in a state in which an electrode assembly (not shown) is housed in a cell case 114. In other words, the battery cell 110 according to the present embodiment has a total of three sealing parts, the sealing part has a structure in which it is sealed by a method such as heat fusion, and the remaining other side part may be composed of a connection part 115. The cell case 114 may be composed of a laminate sheet including a resin layer and a metal layer.

Such battery cells 110 may be formed in plural numbers, and the plurality of battery cells 110 are stacked so as to be electrically connected to each other, thereby forming a battery cell stack 200. In particular, as shown in FIG. 3, the plurality of battery cells 110 may be stacked along the x-axis direction. Thereby, the electrode leads 111 and 112 can be protruded in the y-axis direction and the –y-axis direction, respectively.

Meanwhile, the battery module 100 according to the present embodiment forms a module-less structure in which the module frame and the end plate are removed. Instead of the module frame, the battery module 100 according to the present embodiment may include a side face plate 600 and a holding band 700. As the module frame and the end plate are removed, complicated processes that require precise control, as in the process of housing the battery cell stack 200 inside the module frame, or the process of assembling module frames and end plates, is not necessary. Further, there is an advantage that the weight of the battery module 100 can be significantly reduced only by the removed module frame and end plate. Further, the battery module 100 according to the present embodiment has an advantage that re-workability is advantageous in the battery pack assembly process due to the removal of the module frame. In contrast, the conventional battery module 10 could not be reworked even if a defect occurs due to the welding structure of the module frame.

The side face plate 600 is a plate-shaped member and can be disposed on both side surfaces of the battery cell stack 200 to supplement the rigidity of the battery module 100. Such side face plate 600 has elastic properties and may include a plastic material manufactured by injection molding, and in some cases, a leaf spring material can be applied.

A holding band 700 is a member that wraps the battery cell stack 200 at both end parts of the battery cell stack 200, and can has a function of fixing the plurality of battery cells 110 and the side face plates 600 constituting the battery cell stack 200. After the battery cell stack 200 and the side face plate 600 are fixed via the holding band 700 in this way, an insulating cover 400 can be disposed on the front surface and the back surface of the battery cell stack 200 corresponding to the direction in which the electrode leads 111 and 112 protrude. The battery cells 110 and the side face plate 600 included in the battery cell stack 200 are fixed via the holding band 700, whereby the insulating cover 400 can be easily coupled to the front surface and the back surface of the battery cell stack 200. Such a holding band 700 can be composed of a material having a predetermined elastic force, and specifically, a structure of a leaf spring can be applied.

FIG. 5 is a partial cross-sectional view of the region A of FIG. 3 as viewed on the xy plane.

Referring to FIGS. 3 to 5, in the battery cell stack 200 in which a plurality of battery cells 110 are stacked along the x-axis direction, a first battery cell 110a and a second battery cell 110b adjacent to each other are included. The first electrode lead 111a protrudes from the first battery cell 110a and the second electrode lead 111b protrudes from the second battery cell 110b. At this time, the first electrode lead 111a and the second electrode lead 111b are bent in different directions from each other, and an end part of the first electrode lead 111a and an end part of the second electrode lead 111b overlap with each other. The end part of the first electrode lead 111a and the end part of the second electrode lead 111b overlap to form a welding part WP, and the welding part WP can couple the first electrode lead 111a and the second electrode lead 111b to each other. One of the first electrode lead 111a and the second electrode lead 111b may be a positive electrode lead, and the other may be a negative electrode lead.

According to the present embodiment, an adhesive member 130 may be disposed between the first battery cell 110a and the second battery cell 110b. With such adhesive member 130, the fixing force of the battery cell stack 200, which may become weaker due to the omission of the module frame, can be strengthened.

As shown in FIG. 5, an extra space EP is formed between the welding part WP and the battery cell stack 200 according to the present embodiment. Conventionally, a structure such as a bus bar frame was disposed between the welding part of the electrode lead and the battery cell stack, and adjacent electrode leads were electrically connected via the bus bar fixed to the bus bar frame by heat fusion or the like. However, in the present embodiment, a structure such as a bus bar frame can be omitted, a structure can be formed so that the overlapping part of the first and second electrode leads 111a and 111b on which the welding parts WP are formed is directly opposite to the battery cell stack 200. In this case, by minimizing the extra space EP formed between the formed welding part WP and the battery cell stack 200, the battery module 100 having a more compact configuration can be realized. In addition, a separate member for connecting the electrode leads, such as a bus bar can be omitted to reduce the material cost.

Hereinafter, an example of a method of manufacturing a battery module according to one embodiment of the present invention will be described with reference to FIGS. 6 to 15.

FIGS. 6 to 14 are views illustrating a method of manufacturing a battery module according to another embodiment of the present disclosure.

Referring to FIG. 6, a first battery cell 110a and a second battery cell 110b are arranged in a horizontal direction, and a first electrode lead 111a protruding from the first battery cell 110a and a second electrode lead 111b protruding from the second battery cell 110b are overlapped. The first electrode lead 111a and the second electrode lead 111b are adjacent to each other, and an end part of the first electrode lead 111a and an end part of the second electrode lead 111b can overlap to form a first overlapping part OP1.

FIG. 7 is a view of the figure of FIG. 6 as viewed along the z-axis direction. FIG. 8 is a view showing an overlapping part of FIG. 7.

Referring to FIGS. 7 and 8, the first overlapping part OP1 can be welded. At this time, the welding jig 140 may be arranged on both sides of the first overlapping part OP1.

Laser welding can be performed through the opening 140AP formed in the welding jig 140. The welding jig 140 can simultaneously press the upper surface of the first electrode lead 111a and the lower surface of the second electrode lead 111b, thereby increasing the welding quality. In addition, since the welding is performed in a state in which adjacent battery cells are arranged in a horizontal direction, an obstacle does not exist in an upper side space and a lower side space of the first overlapping part OP1, and thus, it can be easily confirmed whether the surface contact of the welding object is well performed.

Referring to FIGS. 9 to 11, the first electrode lead 111a and the second electrode lead 111b may be bent based on the first overlapping part OP1 shown in FIG. 7. The first electrode lead 111a and the second electrode lead 111b are bent in opposite directions to each other.

The step of bending the first electrode lead 111a and the second electrode lead 111b based on the first overlapping part OP1 is performed using a first jig 150a and a second jig 150b respectively disposed on one surface of the first battery cell 110a and one surface of the second battery cell 110b. At this time, the first jig 150a and the second jig 150b are disposed on mutually different sides based on the first overlapping part OP1. Specifically, as shown in FIG. 10, the first jig 150a is disposed on the upper surface of the first battery cell 110a, and the second jig 150b may be disposed on the lower surface of the second battery cell 110b. The first jig 150a presses a portion of the first electrode lead 111a located between the first battery cell 110a and the first overlapping part OP1, and the second jig 150b may press a portion of the second electrode lead 111b located between the second battery cell 110b and the first overlapping part OP1.

According to the present embodiment, the first jig 150a rotates together with the first battery cell 110a so that the second battery cell 110b and the first battery cell 110a are vertically arranged. Referring to FIG. 12, the adhesive member 130 may be formed on the lower surface of the second battery cell 110b before bending the first electrode lead 111a and the second electrode lead 111b. As shown in FIGS. 9 and 12, an opening 150P is formed so that the first and second battery cells 110a and 110b are inserted into formed in the first and second jigs 150a and 150b, respectively. The adhesive member 130 is exposed by the opening 150P of the second jig 150b, and the first battery cell 110a rotates together with the first jig 150a so that one surface of the first battery cell 110a can be coupled to the adhesive member 130. At this time, the first battery cell 110a and the second battery cell 110b can be coupled to each other by the adhesive member 130.

Referring to FIG. 13, the second battery cell 110b and the third battery cell 110c are arranged in a horizontal direction, and the third electrode lead 112a protruding from the second battery cell 110b and the fourth electrode lead 112b protruding from the third battery cell 110c can be overlapped with each other. Thereafter, in the same manner as described with reference to FIGS. 7 and 8, the second overlapping part OP2 of the third electrode lead 112a and the fourth electrode lead 112b can be welded. The second electrode lead 111b and the third electrode lead 112a have different polarities from each other, and the second electrode lead 111b and the third electrode lead 112a may be located at mutually different end parts based on the longitudinal direction of the second battery cell 110b.

Thereafter, in the same manner as described with reference to FIGS. 9 to 11, the third electrode lead 112a and the fourth electrode lead 112b are bent based on the second overlapping part OP2, so that the second battery cell 110b and the third battery cell 110c can be vertically arranged. However, the bending direction of the first electrode lead 111a and the second electrode lead 111b shown in FIGS. 9 to 11, and the bending direction of the third electrode lead 112a and the fourth electrode lead 112b are different from each other. Specifically, the first overlapping part OP1 is bent downward based on the second battery cell 110b shown in FIG. 13, but the second overlapping part OP2 is bent upward to form a zigzag structure with each other. Similarly to that shown in FIG. 12, an adhesive member is formed on the upper surface of the second battery cell 110b or the upper surface of the third battery cell 110c, and when the third battery cell 110c rotates, the second battery cell 110b and the third battery cell 110c can be coupled by an adhesive member located between the second battery cell 110b and the third battery cell 110c.

Therefore, the first battery cell 110a, the second battery cell 110b, and the third battery cell 110c are vertically arranged, and a plurality of battery cells 110 may be stacked in a zigzag direction in this manner to form a battery cell stack 200 having a plurality of overlapping part OP as shown in FIG. 14. Thereafter, an insulating cover can be formed so as to cover both end parts of the battery cell stack 200, thereby manufacturing the battery module 100 shown in FIG. 2.

According to the present embodiment, the welding quality is improved by welding the electrode leads before bending, and if a defect occurs during welding, only the corresponding battery cell may be discarded. Therefore, it is possible to prevent the problem of having to dispose of even reusable battery cells from the battery cell stack.

FIG. 15 is an exploded perspective view illustrating a battery pack according to another embodiment of the present disclosure.

Referring to FIG. 15, a battery pack 1000 according to one embodiment of the present disclosure may include a battery module 100, a pack frame 1100 for housing the battery module 100, and a heat conductive resin layer 1200 located between the battery module 100 and the bottom part 1111 of the pack frame 1100.

First, the battery module 100 includes an insulating cover as described above, and instead may form a module-less structure in which the module frame and the end plate are removed. A plurality of such battery modules 100 can be housed in the pack frame 1100 to form the battery pack 1000.

The pack frame 1100 may include a lower pack housing 1110 and an upper pack housing 1120 that covers the lower pack housing 1110, and a plurality of battery modules 100 may be disposed on the bottom part 1111 of the lower pack housing 1110. The lower pack housing 1110 has a plurality of module regions, and the plurality of module regions may be partitioned by a plurality of partition walls 1350 formed in the lower pack housing 1110. The partition wall 1350 is formed between battery modules 100 adjacent to each other among the plurality of battery modules 100. For example, the heat conductive resin layer 1200 includes a first heat conductive resin layer and a second heat conductive resin layer adjacent to each other, the plurality of module regions include a first region and a second region that are partitioned from each other by a partition wall 1350, the first heat conductive resin layer is formed so as to correspond to the first region, and the second heat conductive resin layer may be formed so as to correspond to the second region. At this time, the first heat conductive resin layer and the second heat conductive resin layer may be disposed separately from each other by the partition wall 1350.

Meanwhile, the heat conductive resin layer 1200 may be formed by applying a heat conductive resin to the bottom part 1111 of the lower pack housing 1110. The heat conductive resin may include a heat conductive adhesive material, and specifically, may include at least one of silicone material, urethane material, and acrylic material. The heat conductive resin is a liquid during application but is cured after application, so that it can perform the role of fixing the battery module 100 to the lower pack housing 1110. Further, since the heat conductive resin has excellent heat transfer properties, heat generated from the battery cell 100 can be quickly transferred to the bottom part 1111, thereby preventing overheating of the battery pack 1000.

According to the present embodiment, since the module frame is omitted in the battery module 100, the lower surface of the battery cell stack 200 of FIG. 3 can be mounted directly on the heat conductive resin layer 1200 applied to the lower pack housing 1110. At this time, the battery cell stack 200 can be fixed to the lower pack housing 1110 by the heat conductive resin layer 1200 having adhesive performance.

As shown in FIG. 2, in the battery module 100 according to the present embodiment, a part of the battery cell 110 can be exposed to the outside in the module-less structure in which the module frame is removed, and it is essential to fix the exposed battery cell 110 for structural stability. Therefore, the battery pack 1000 according to the present embodiment can form a heat conductive resin layer capable of fixing the battery module 100, particularly, each battery cell 110 constituting the battery module 100, to the bottom part 1111, thereby improving the structural stability. Further, by eliminating the module frame, the heat generated from the battery cells can be directly transferred from the heat conductive resin layer to the pack frame, thereby improving the cooling efficiency. Although not shown, a heat sink structure may be formed on the pack frame.

The battery module or the battery pack according to embodiments of the present disclosure as described above can be applied to various devices. Specifically, such a device may be applied to a vehicle means such as an electric bicycle, an electric vehicle, or a hybrid vehicle, but the present disclosure is not limited thereto, and is applicable to various devices that can use a battery module.

Although the invention has been shown and described above with reference to the preferred embodiments, the scope of the present disclosure is not limited thereto, and numerous other modifications and embodiments can be made by those skilled in the art, which falls within the spirit and scope of the principles of the invention described in the appended claims.

[Description of Reference Numerals]

| | |
|---|---|
| 110: battery cell | 130: adhesive layer |
| 140: welding jig | 150a, 150b: first and second jigs |
| 400: insulating cover | 700: holding band |
| 1000: battery pack | 1100: pack frame |

The invention claimed is:

1. A method of manufacturing a battery module, the method comprising:
arranging a first battery cell and a second battery cell in a horizontal direction, and overlapping a first electrode lead protruding from the first battery cell and a second electrode lead protruding from the second battery cell;
welding a first overlapping part of the first electrode lead and the second electrode lead;
vertically arranging the first battery cell and the second battery cell by bending the first electrode lead and the second electrode lead based on the first overlapping part, and
coupling the first battery cell and the second battery cell to each other by a first adhesive member,
wherein the bending of the first electrode lead and the second electrode lead based on the first overlapping part is performed using a first jig and a second jig respectively disposed on one surface of the first battery cell and one surface of the second battery cell, and the first jig and the second jig are disposed on mutually different sides based on the first overlapping part.

2. The method of claim 1, wherein:
the first jig presses the first electrode lead, the second jig presses the second electrode lead, and
the first jig rotates together with the first battery cell, so that the first battery cell and the second battery cell are vertically arranged.

3. The method of claim 2, which further comprises:
disassembling the first jig and the second jig, after the vertically arranging of the first battery cell and the second battery cell,
wherein the first jig and the second jig are disassembled into two equal parts, respectively.

4. The method of claim 1, further comprising:
arranging the second battery cell and a third battery cell in the horizontal direction, and overlapping a third electrode lead protruding from the second battery cell and a fourth electrode lead protruding from the third battery cell;
welding a second overlapping part of the third electrode lead and the fourth electrode lead;
vertically arranging the second battery cell and the third battery cell by bending the third electrode lead and the fourth electrode lead based on the second overlapping part; and
coupling the second battery cell and the third battery cell to each other by a second adhesive member,
wherein a direction in which the first electrode lead and the second electrode lead are bent and a direction in which the third electrode lead and the fourth electrode lead are bent based on the second overlapping part form a zigzag structure with each other.

5. The method of claim 4, wherein:
the second electrode lead and the third electrode lead have different polarities from each other, and the second electrode lead and the third electrode lead are located at mutually different end parts based on a longitudinal direction of the second battery cell.

6. The method of claim 1, wherein:
the welding of the first overlapping part further comprises pressing both surfaces of the first overlapping part by welding jigs disposed on the both surfaces of the first overlapping part.

7. The method of claim 6, wherein the welding jigs include openings arranged in a longitudinal direction of the welding jigs, and
wherein a laser welding is performed through the openings.

* * * * *